W. TOEPFER.
Malt-Kiln.
No. 226,890. Patented April 27, 1880.
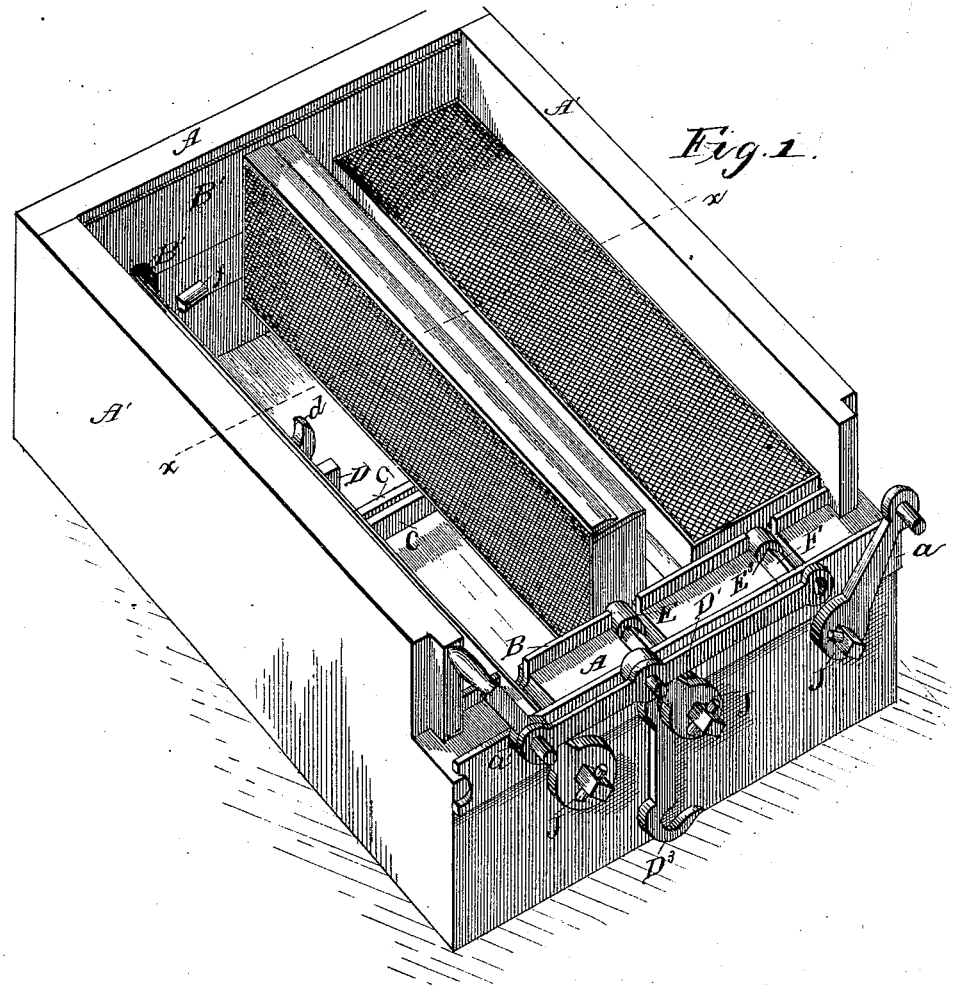
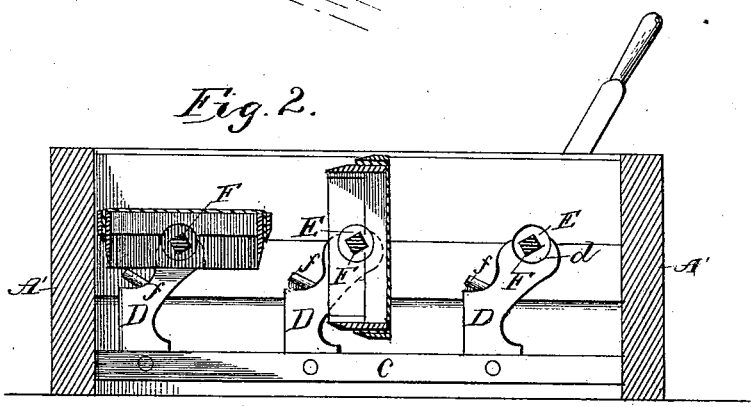

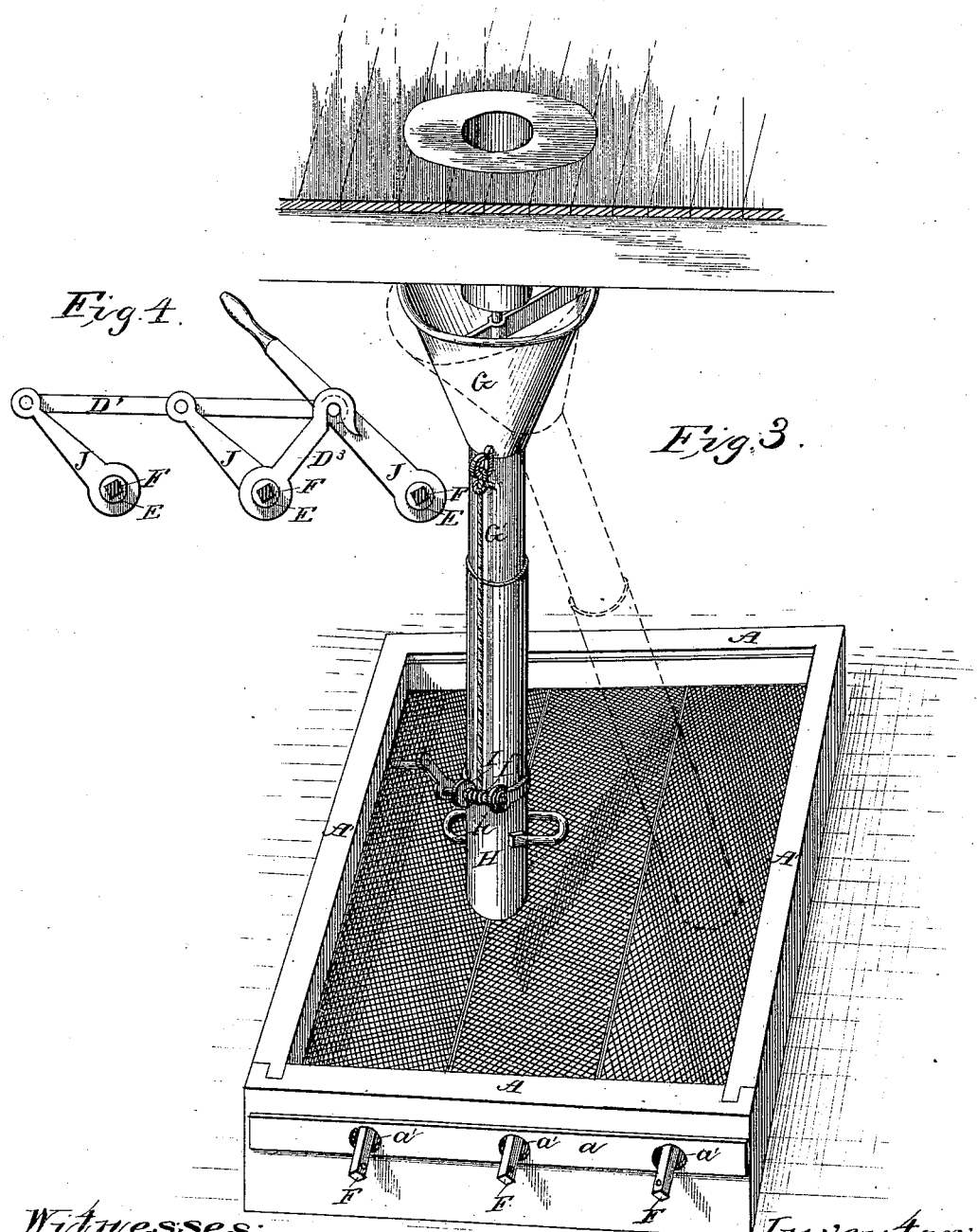

UNITED STATES PATENT OFFICE.

WENZEL TOEPFER, OF MILWAUKEE, WISCONSIN.

MALT-KILN.

SPECIFICATION forming part of Letters Patent No. 226,890, dated April 27, 1880.

Application filed February 7, 1880.

*To all whom it may concern:*

Be it known that I, WENZEL TOEPFER, of Milwaukee, in the county of Milwaukee, and in the State of Wisconsin, have invented certain new and useful Improvements in Malt-Kilns; and I do hereby declare that the following is a full, clear, and exact description thereof.

My invention relates to kilns for drying malt; and it consists, first, in certain devices for suspending and dumping the drying-trays, and, second, in a device for conducting the sprouted malt to and distributing it over the surface of the trays.

In the drawings, Figure 1 is a perspective view of one floor of a malt-kiln in which I have embodied the first part of my invention; Fig. 2, a section of the same on line $x\ x$, Fig. 1; and Fig. 3 is a view, in perspective, of the device embraced in the second part of my invention. Fig. 4 is a detail view, showing the means by which the trays are operated simultaneously, and also that by which they are locked in a horizontal position.

A A A' A' represent the walls of the kiln. In the walls A A, I leave openings, in which I affix bearing-plates B B', and across from the walls A' A', I suspend girders C, to which I attach bearing-brackets D D. These brackets project upward for about half their length at right angles to the girders, and are then deflected at an angle of about forty-five degrees, terminating in bearings $d$.

The trays are constructed as follows: I make them about twelve inches wide and of any length up to fifty feet, with metallic frames, over which coarse wire-gauze is stretched and fastened by side pieces riveted on the outside. They are also provided with journals E at their ends, and as many more along their length as may be necessary to afford a proper support, and these journals I make hollow, with square bearings, for the operating-rods F, which are also square. Now, the rear journals of the trays having been thrust into the bearings B' in the rear wall, the other journals will naturally drop into their respective bearings, after which the front bearings may be covered by a face-plate, which I make easily removable, and the joint protected by face-plates $a$ cut out at $a'$, to correspond with the bearings B. The trays will now be free to make a quarter of a revolution in one direction, studs $f\ f$ preventing their revolution in the other direction, and, together with the shanks of the standards D, stopping them on the quarter or after they have passed slightly beyond it, the jar caused by the violent contact entirely ridding the trays of the malt.

To bring about this dumping I provide square rods F with crank-arms J, and pass the rods F through the journals E, connecting the crank-arms by a bar, D', using one of the arms as a handle by which to dump all of the trays in a series at once.

When the trays are ready to receive the malt, or are full, I retain them in position by a hook, $D^3$, as shown in detail in Fig. 4. This locking-hook $D^3$ is pivoted on one of the inner tilting-shafts, so that it can be turned to lock over either of the next exterior cranks at its juncture with the bar D', or over a pin thereon, as shown in Fig. 4, and accordingly as the shafts have been rotated to bring the trays into a horizontal position, or to tilt them, the hook, by change of position, can be used to secure the trays in either position. In the present instance, where only three trays are used, the hook $D^3$ is pivoted to the tilting-shaft of the central tray. By this means I obtain not only a positive tilting mechanism, but a positive locking mechanism, which is simple, effective, and will obviate any liability to accidental tilting of the trays.

Heretofore it has been impossible to use very long iron trays and to operate them from the outside, as it was difficult to control them, owing to their liability to spring and twist. Long wooden trays are open to the same objection, and have had to be dumped separately by an operative who entered the kiln; but by means of my square rods F, I can apply the dumping force equally along the entire length of the trays, and as there is no keying to be done, there will never be any danger of the parts becoming loose or getting out of order, and besides each tray may be easily removed by itself without displacing any of the others.

I will now describe my device for conducting the sprouted malt to and distributing it over the trays. This is shown in Fig. 3, Sheet 2, in which G is a funnel attached to the mouth of a spout leading from the malt-room by a swivel-joint, its neck G' depending over the drying-floor. This neck is provided with a pipe, H, which slides freely upon it, and the pipe is provided with a bail or handle, h, and also with brackets I, which sustain a windlass, I'. A rope, J, depending from the funnel and attached about the windlass, serves to support and control the pipe H.

Now, when the upper series of trays are to be covered with malt, it is permitted to fall through the spout into the funnel G, attendants supporting the pipe H by means of its handle or bail, carrying its end about over the floor, unwinding the rope to permit it to reach the remote parts or corners, and winding it to carry it clear of the portions near the center and to distribute the malt evenly. The funnel may then be drawn to one side, and its end hung up out of the way. I may find it necessary to provide the pipe H with a valve for stopping the flow of malt, but it will not be necessary under ordinary circumstances.

What I claim is—

1. In a malt-drier, a removable tilting-tray provided with journals having bearings in the end walls of the kiln and on an intermediate bracket or brackets, the journals of the trays having polygonal openings for the reception of a polygonal tilting-shaft, in combination with a corresponding tilting-shaft, substantially as and for the purpose specified.

2. In a malt-drier, the combination of three or more tilting trays provided with tilting-shafts having crank-arms, a coupling bar or rod for connecting the crank-arms of the tilting-shafts, and a locking-hook pivoted to the central tilting-shaft and adapted to fit over either of the outer shafts, the whole arranged substantially as and for the purpose specified.

3. In a malt-drier, the combination of the funnel, swiveled, as described, with the pipe H, having windlass and handle or bail, and the rope for connecting it with the funnel.

In testimony that I claim the foregoing I have hereunto set my hand this 31st day of January, 1880.

WENZEL TOEPFER.

Witnesses:
FRANK TOEPFER,
S. S. STOUT.